United States Patent Office

3,243,918
Patented Apr. 5, 1966

3,243,918
METHOD FOR PROPAGATING PHOTOSYNTHETIC MICROORGANISMS
Juraj Lauro Machiedo, Jelsa, otok Hvar, Yugoslavia, assignor of fifty percent to Robert A. Erkins, Buhl, Idaho
No Drawing. Filed Mar. 13, 1963, Ser. No. 264,778
6 Claims. (Cl. 47—1.4)

This invention relates to a process for the propagation of photosynthetic micoorganisms in suspension.

Among the photosynthetic micoorganisms contemplated are algae, including Chlorella, and *Chlorella pyrenoidosa* which are among the more useful microorganisms for which the method of the present invention has been found to be beneficial at this time.

In particular, the present invention contemplates a process for producing intermittent lighting of suspensions of unicellular photosynthetic microorganisms in order to enhance their propagation.

Therefore, the primary object of the present invention is to propagate photosynthetic microorganisms.

Another object of the present invention is to disclose a unique manner of lighting cultures of unicellular photosynthetic microorganisms in order to encourage the propagation and growth of such microorganisms.

Additional objects and advantages will become apparent from a detailed consideration of the concepts of the invention as described below.

In accordance with the principles of the present invention, it has been known that the growth of *Chlorella pyrenoidosa*, and other algae, microorganisms is best accomplished in an environment containing sufficient quantities of carbon dioxide for the desired photosynthesis and a bountiful supply of nutrient compounds susceptible to absorption by the microorganism for prolific propagation. Therefore, the present invention contemplates the suspension of the unicellular microorganisms in an aqueous solution containing carbon dioxide and nutrient salts in a dissolved state.

It has been discovered that when such a suspension of *Chlorella pyrenoidosa* microorganisms is subjected to light rays having a wave length of between 4,000 to 7,000 Angstrom units, there is a penetration by the light at the surface of such suspension. The depth to which the light rays penetrate depends upon the intensity of the light and the density of the suspension. Accordingly, when a light source of proper intensity is directed on a suspension of a certain density, a thin layer described as a lighted zone is created. Below such lighted zone is a dark zone into which the light rays cannot penetrate because they are fully absorbed by the microorganisms floating in the lighted zone.

It has also been discovered that the microorganisms in the lighted zone are subjected to a light energy level of an intensity greater than that which they can readily absorb and utilize for purposes of photosynthesis during any particular period of the microorganism's subjection to the light energy. Accordingly, the subjection of the unicellular microorganisms to intermittent flashes of light produces greater propagation and growth than when the microorganisms are subjected to continued lighted conditions over a long period of time, since it will be appreciated that the periods of darkness obviate conditions of light saturation and permit the microorganisms to absorb and utilize the light energy completely in order to achieve rapid photosynthesis.

In the process of the present invention intermittent lighting is created for the microorganisms in suspension in order to produce propagation of the unicellular photosynthetic microorganisms. The field of lighting created by the light source includes a flat, shallow trough having a smooth bottom and sides and at a sufficient angle to permit proper rate of flow of the suspension. Within this field of lighting the volume of the suspension flows in a very thin layer of between 1 to 5 centimeters depending upon the particular microorganism concentration through the trough from its upper end to its lower, at which lower point a pumping device returns the volume of the suspension to the upper level of the trough in order to recycle the suspension through the field of lighting. It is during this step of recycling that necessary changes are made in the cultural environment by the addition of carbon dioxide and various nutrients and the withdrawal of the microorganisms in order to maintain the desired characteristics for the suspension. In view of the small volume of suspension capable of floating through the field of lighting for purposes of exposure to the light, the total volume of the suspension passes through a great number of the above described cycles throughout the period of exposure.

Within the trough are arranged an appropriate number of small rotors, their size adapted to the thinness of the layer of the moving suspension. Their axes are perpendicular to the direction of the suspension's flow, such that by means of a high speed of the rotors within the thin layer of suspension a vigorous and turbulent eddy movement of the unicellular photosynthetic microorganisms is produced.

Due to such eddy movement within the field of lighting it can be seen that the microorganisms will be in rapid motion between the lighted and dark zones whereby during a microorganism's travel through the lighted zone it will be subjected to a flash of light of high intensity and through the dark zone it will have sufficient time to properly and efficiently utilize the light energy absorbed during the light flash. The time period for the preceding light flash is found to be most effective when less than 4 milliseconds and the microorganism effectively employs the light energy toward a greater degree of propagation when the time period for darkness is at least ten times as long as the light flash.

Of course, the ratio of the time period for which an average microorganism will spend in the lighted zone to the time period in the dark zone depends primarily on the relative depths of perceptible light and dark zones. Further, as stated previously, the depth of the lighted zone depends upon the intensity of the light source and the concentration of the microorganisms in suspension. Accordingly, depending upon the incident light intensity, the concentration of the unicellular microorganisms should be great enough to create a lighted zone at the surface which is only one-tenth the total depth of the flowing suspension. Further, the lighted zone time period for the microorganism is dependent on the speed of the rotors and the depth of such zone. Since it has been found that the greatest propagation is achieved for light flashes of less than four milliseconds, the rotor speed should be as high as practically possible.

Accordingly, by having the suspension circulate through the trough with simultaneous eddying of the unicellular photosynthetic microorganisms within the thin layer of the suspension, each of said microorganisms should be forced to absorb during the period of each cycle of travel through the lighted and dark zones a unit of intermittent light exposure of high level. It will be appreciated that the light effect produces high level utilization of available photoenergy. The number of such highly effective intermittent light exposures which a unicellular photosynthetic microorganism can absorb during the time it flows from the upper end of the trough to the lower, multiplied by the number of passes which a microorganism can make through the field of lighting during the hours of lighting due to the continuous recycling of the suspension gives the total number of exposures to intermittent light on a high level of utilization of available photoenergy which during the hours of lighting a unicellular photosynthetic microorganism can absorb in such a field of lighting.

The cost per square area of the field of lighting for the suspension is extremely low. The cost of the continuous pumping of the suspension in order to recycle the flow thereof across a field of lighting is also low. Similar low cost is involved in operating the small rotors in the trough for the purpose of generating the eddy movements in the suspension.

By means of this invention it has now become possible to achieve efficient intermittent high energy lighting of a suspension within the field of lighting under sunlight of maximum intensity as well as under artificial cold light having an intensity several times that of strong or extremely intense sunlight.

It will be apparent that many changes and modifications of the several features described herein may be made without departing from the spirit and scope of the invention. It is therefore apparent that the foregoing description is by way of illustration of the invention rather than limitation of the invention.

What is claimed as new is as follows:

1. A method for propagating unicellular photosynthetic microorganisms comprising producing an elongated thin stream of a nutrient suspension containing said microorganisms, flowing said stream through an illuminated field of lighting having a wave length between 4,000 and 7,000 Angrstrom units thereby producing perceptible lighted and dark zones in the suspension, agitating said suspension to produce eddy currents to move portions of said microorganisms directly into confrontation with the light in said lighted zone for absorption of the light energy, and to move other portions away from said lighted zone thereby causing a period of darkness for the microorganism to efficiently utilize the previously absorbed light energy, the microorganism which is the means representative of the microorganisms in suspension being outside the lighted zone for at least ten times as long as it is within said lighted zone.

2. The method of claim 1 wherein the suspension is re-circulated for continuous flow through the illuminated field of lighting.

3. The method of claim 1 wherein the microorganisms in suspension within said field of lighting is within the lighted zone for less than four milliseconds.

4. The method of claim 1 wherein the field of lighting in created by sunlight as the light source.

5. The method of claim 1 wherein said elongated stream has a depth of 1–5 centimeters.

6. The method of claim 1 wherein the ratio of the depths of the said dark zone to said lighted zone is greater than ten.

References Cited by the Examiner

UNITED STATES PATENTS 2,949,700  8/1960  Kathrein _____ 195—28
2,974,044  3/1961  Farrows et al. _____ 195—28

OTHER REFERENCES

Hill, Advances in Enzymology, Interscience Publishers, Inc., New York, 1951, pp. 1–39.

West et al., Textbook of Biochemistry, The MacMillan Co., New York, June 1961, pp. 1000–1005.

A. LOUIS MONACELL, *Primary Examiner.*

D. M. STEPHENS, *Assistant Examiner.*